US009371774B2

(12) United States Patent
Lescure et al.

(10) Patent No.: US 9,371,774 B2
(45) Date of Patent: Jun. 21, 2016

(54) FULLY AUTOMATED EMERGENCY GENERATOR FUEL OIL SYSTEM AND METHOD FOR OPERATION THEREOF

(76) Inventors: Michael Lescure, Danville, CA (US); Allen Lescure, Danville, CA (US); Brian Lescure, Danville, CA (US)

( * ) Notice: Subject to any disclaimer, the term of this patent is extended or adjusted under 35 U.S.C. 154(b) by 682 days.

(21) Appl. No.: 13/615,495

(22) Filed: Sep. 13, 2012

(65) Prior Publication Data

US 2013/0133750 A1 May 30, 2013

Related U.S. Application Data

(60) Provisional application No. 61/534,329, filed on Sep. 13, 2011.

(51) Int. Cl.
*F16N 29/02* (2006.01)
*F02B 63/04* (2006.01)

(52) U.S. Cl.
CPC ........... *F02B 63/04* (2013.01); *Y10T 137/0324* (2015.04); *Y10T 137/7759* (2015.04)

(58) Field of Classification Search
None
See application file for complete search history.

(56) References Cited

U.S. PATENT DOCUMENTS

| | | | |
|---|---|---|---|
| 3,898,439 A | 8/1975 | Reed et al. | |
| 4,091,846 A | 5/1978 | Legleiter | |
| 5,268,850 A * | 12/1993 | Skoglund | 700/297 |
| 5,400,924 A | 3/1995 | Brodie | |
| 5,960,809 A | 10/1999 | Keller | |
| 5,979,485 A | 11/1999 | Tuckey et al. | |
| 6,371,153 B1 | 4/2002 | Fischerkeller et al. | |
| 6,385,919 B1 * | 5/2002 | McCarthy | 52/169.6 |
| 6,441,505 B1 | 8/2002 | Poletti et al. | |
| 6,792,966 B2 | 9/2004 | Harvey | |
| 7,100,631 B2 | 9/2006 | Liu et al. | |
| 7,617,725 B2 | 11/2009 | Howayshell | |
| 2004/0134533 A1 | 7/2004 | Cowan | |
| 2008/0128029 A1 * | 6/2008 | Gorman | 137/209 |
| 2011/0260473 A1 * | 10/2011 | Batzler et al. | 290/40 C |

FOREIGN PATENT DOCUMENTS

| | | |
|---|---|---|
| JP | 9-16269 | 1/1997 |
| JP | 9-158801 | 6/1997 |
| JP | 2004-257300 | 9/2004 |
| WO | PCT/US2012/055253 | 3/2013 |

* cited by examiner

*Primary Examiner* — Sean Shechtman
(74) *Attorney, Agent, or Firm* — Brian Beverly; Beeson Skinner Beverly, LLP

(57) ABSTRACT

A fully automated emergency generator fuel oil system comprises a plurality of emergency generator fuel oil system components, a plurality of sensors for continuously monitoring the physical status of the system components, and a master control panel in communication with the plurality of sensors, wherein a master control panel in operative communication with the system components interprets signals received from the plurality of sensors to determine if an event has occurred, an event indicating the physical status of one or more of the system components, and when an event has occurred, the master control panel issues one or more instructions responsive to the event that control the function of one or more of the system components.

19 Claims, 10 Drawing Sheets

Master Control Panel

FULLY AUTOMATED EMERGENCY GENERATOR FUEL OIL SYSTEM AND METHOD FOR OPERATION THEREOF

CROSS-REFERENCE TO RELATED APPLICATIONS

This application claims the benefit of U.S. Patent Application No. 61/534,329 filed Sep. 13, 2011.

BACKGROUND

1. Field of the Invention

This invention relates to fuel oil systems generally, and particularly to emergency generator fuel oil systems and a new method for fully automated operation thereof.

2. Prior Art

Conventional emergency generator fuel oil delivery systems consist of an assembly of mechanical parts including holding tanks, a piping system, and control valves all of which delivers fuel oil to one or more fuel oil emergency generators. Until fairly recently operation of such systems was manual requiring the system operator to physically throw switches and turn valves on or off. By the mid-1990s, in order to ensure the operational integrity of emergency generator fuel oil systems, owners were requiring monthly or even weekly testing and certification by qualified facility engineers or by fuel oil service contractors.

In the mid-2000s owners and end users began requiring that systems be fully automated and capable of being integrated into building management systems, requesting features such as remote monitoring and troubleshooting, and the ability to adjust equipment function through computer systems connected to the system via local and wide area computer networks. Unfortunately, no systems or equipment had by then been developed that complied with those requirements.

Even though some prior art systems have been provided with an automatic operating mode, entering into the automatic operating mode requires performing a manual operation such as flipping a switch or pressing a button in an control panel. Moreover, the extent to which such systems have been automated is limited to the use of electronic monitoring panels that merely read or sense fluid levels, fluid loss or leakage, and loss of testing vacuum. These preexisting monitoring devices are programmed and designed to generate audible and visual warnings, print alarm reports, and alert end users to call a physical plant engineer to respond to the problem, but they do not automatically react or respond to such alerts with appropriate corrective action. No prior art emergency generator fuel oil delivery systems provides hands-free fully automated operation, the ability to program the system for remote operation and management, or the capacity to return unused fuel to storage tanks for cleaning and reuse.

BRIEF DESCRIPTION OF THE ILLUSTRATIONS

DETAILED DESCRIPTION OF THE ILLUSTRATED EMBODIMENT

Figure 1:
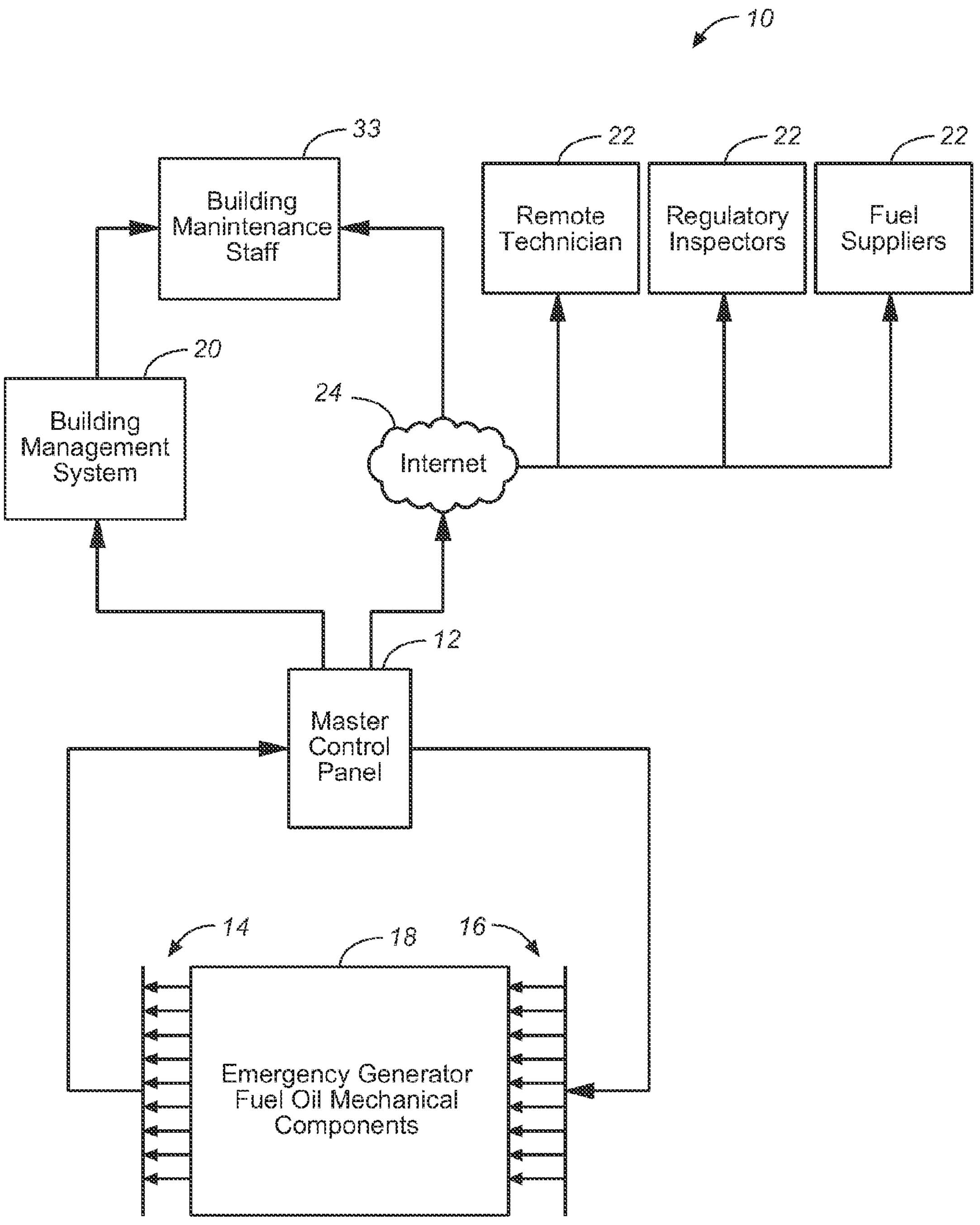
FIG. 1 is a schematic overview of a fully automated emergency generator fuel oil system according to the invention.

A fully automated emergency generator fuel oil system according to the invention is referred to generally at reference number 10 in FIG. 1. The system electronically monitors and manages every aspect of an emergency generator fuel oil system, automatically cleans and tests fluids circulating through the system on a regular schedule, monitors and adjusts fluid levels, pressures, temperature, viscosity and cleanliness, adjusts the system for optimum performance, and generates reports and alarms based upon information received from an network of sensors distributed throughout the system.

Master Control Panel

Figure 2:
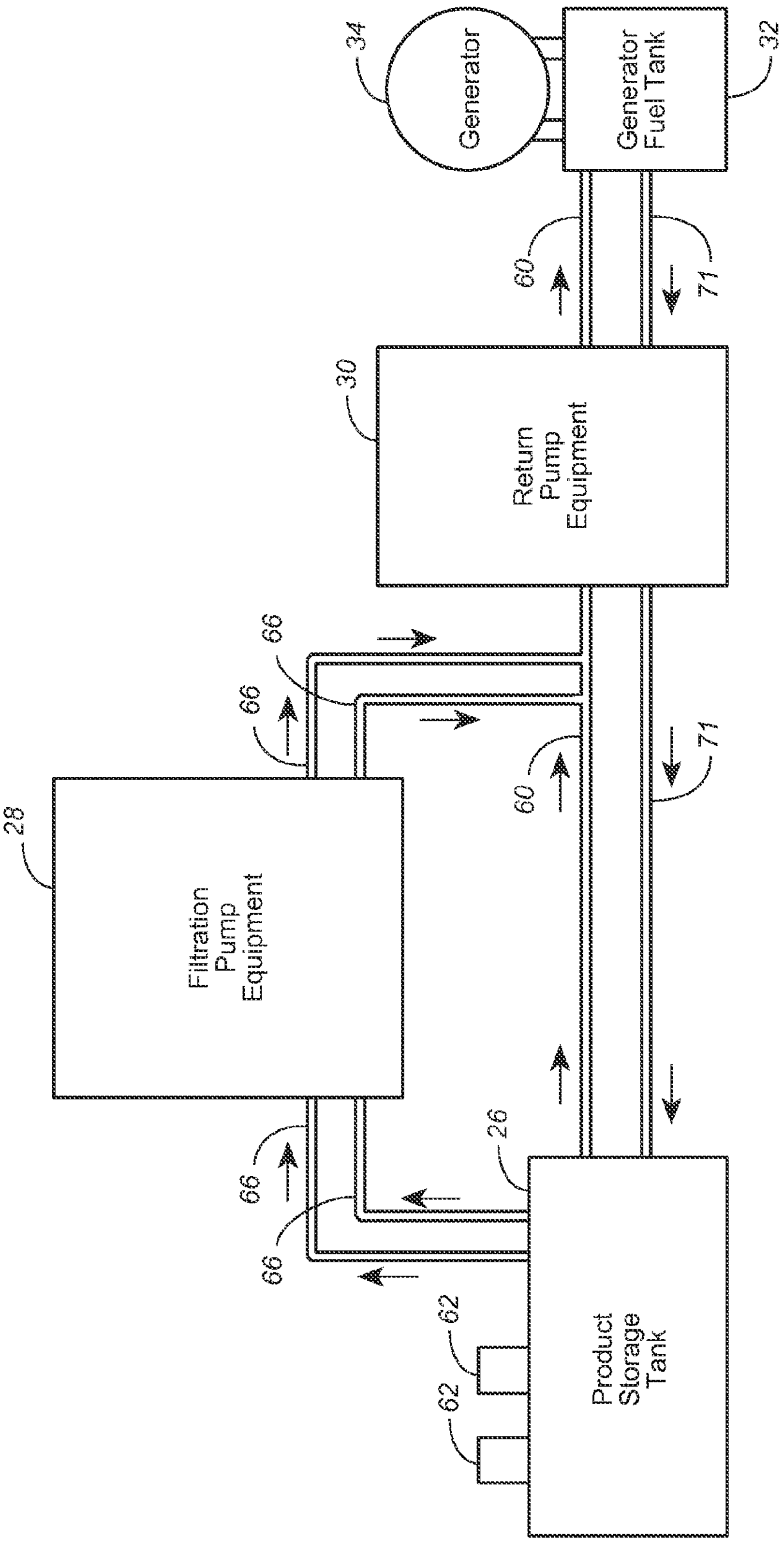
FIG. 2 is a schematic representation of the major mechanical components of the fully automated emergency generator fuel oil system shown in FIG. 1.

The system comprises a master control panel (MCP) 12 in electrical communication with sensors 14 and controls 16 installed on the mechanical components 18 of an emergency generator fuel oil system that requires monitoring or adjustment. The master control panel 12 is in electrical communication with the owner's building management system 20 which in turn is in communication with building maintenance staff 133. The master control panel is also in electrical communication with system technicians 22, regulatory inspectors 134 and fuel suppliers 135, through a computer network 24 such as the internet. With added reference to FIG. 2, the major mechanical components of the system include product storage tank 26, filtration pump equipment 28, return pump equipment 30, a generator fuel tank 32, and a generator 34.

The MCP 12 continuously reads signals received from each sensor 14 indicating the physical status of the components of the system and issues instructions to control mechanisms 16 to orchestrate overall fuel supply, detect leaks, manage inventory, and control filtration cycles. Based on the status of the components of the system, the MCP 12 issues instructions which execute protocols programmed by the system technician 26 governing system functions including product delivery, fuel return, cleaning and servicing, and alarm and test reports. Each step of the instructions is performed by a series of steps which are executed through timers, relays and controllers until designated output commands are satisfied.

While the MCP 12 is monitoring and operating the system, it is also recording system commands and actions being performed for building reports for the building management system 20 and system technicians 22. The MCP 12 is preprogrammed by the system technicians 22 for daily, weekly and monthly automatic testing, cleaning and complete function cycles, and for state and federal ecological code compliant testing and monitoring reports, including EPA requirements, hazardous materials handling, fire codes, and spill and leak prohibitions. The MCP 12 can be reprogrammed from a remote location as needed to correct system performance based on the performance reports.

Figure 5:
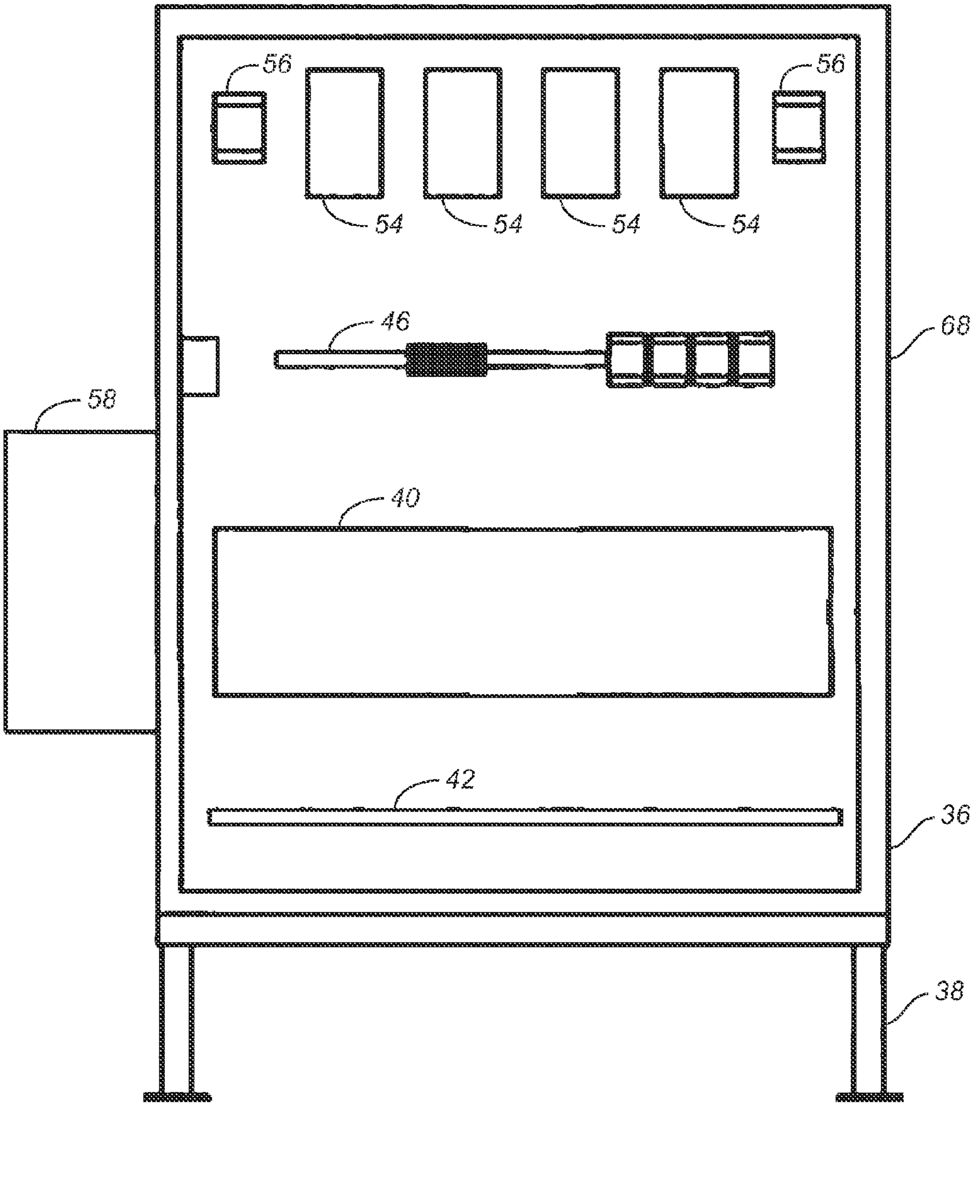
FIG. 5 is a schematic representation of the master control panel thereof.

With additional reference to FIG. 5, the MCP is completely enclosed in and protected by a master control panel cabinet 68 that is engineered to withstand the effects of a seismic event of at least 8.0 on the Richter scale. By collecting and protecting the MCP in the seismically resistant master control panel cabinet 68, it is much more likely to survive the catastrophic effects of a major earthquake.

In one embodiment of the invention the MCP 12 comprises the following components:

an seismically resistant enclosure 36;

a heavy duty seismic base 38, designed to withstand or exceed seismic certification requirements consistent with a seismic event measuring up to 8.2 on the Richter scale, to support and elevate enclosure 36 and provide anchorage points;

a sensor monitoring console 40;

a 12-input AC input module 42;

four submersible turbine pump single phase smart controllers 54;

two 230V 1.5 HP motor starters 56; and an 1800 BTU 115V side mount air conditioner 58.

A suitable enclosure is a Hoffman® two-door type 12 UL and NEMA rated enclosure available from Pentair Technical Products located in Anoka, Minn. A suitable sensor monitoring console is a welded steel Incon TS-5000 console with an Incon TS-EXPC expansion console, including multiple module slots, a built-in power supply module, controller module, Ethernet port, serial ports, USB port, RS-485 port, and a controller area network bus, available from Franklin Fueling Systems located in Madison, Wis.

Additional components in one embodiment may include:

six 8-input, 4-output I/O modules, having a total capacity of 48 inputs of 3-240V AC or DC, and 24 outputs;

12-channel probe modules;

12-channel two-wire sensor modules;

8-channel, 2 AMP relay modules having a total capacity of 48 outputs;

8-channel three-wire sensor module; and 120V 10 A time delay relays with base;

In one aspect of the invention a call for fuel activates a turbine and time delay relay, a time delay relay is held open for 15 seconds and then times out. During these 15 seconds, fuel flows from the turbines, down the product supply pipes, where product pushes against a flow switch, or not. If the flow switch is pushes at the end of the 15 seconds, nothing further is required by the MCP. If flow switch is not pushed at end of 15 seconds, the MCP sends out an alarm and notification of pump failure. The MCP then commands the next pump in line to come on and repeats the previous actions as previously described. This action will continue until a pump is found that pushes product through the flow switch. Notifications are sent out to technicians every time the MCP looks for another pump. Without the time delay relay, to would not be possible to move between pumps.

Product Storage Tank

The product storage tank 26 is in fluid communication with a generator fuel tank 32 through supply piping 60. Primary pumping equipment 62 pumps fuel oil from product storage tank 26 to generator fuel tank 32 as the fuel level in the generator fuel tank is drawn down below a designated low normal level as discussed in greater detail below. Suitable primary pumping equipment is a submersible turbine pump.

Filtration Pump Equipment

Figure 3:
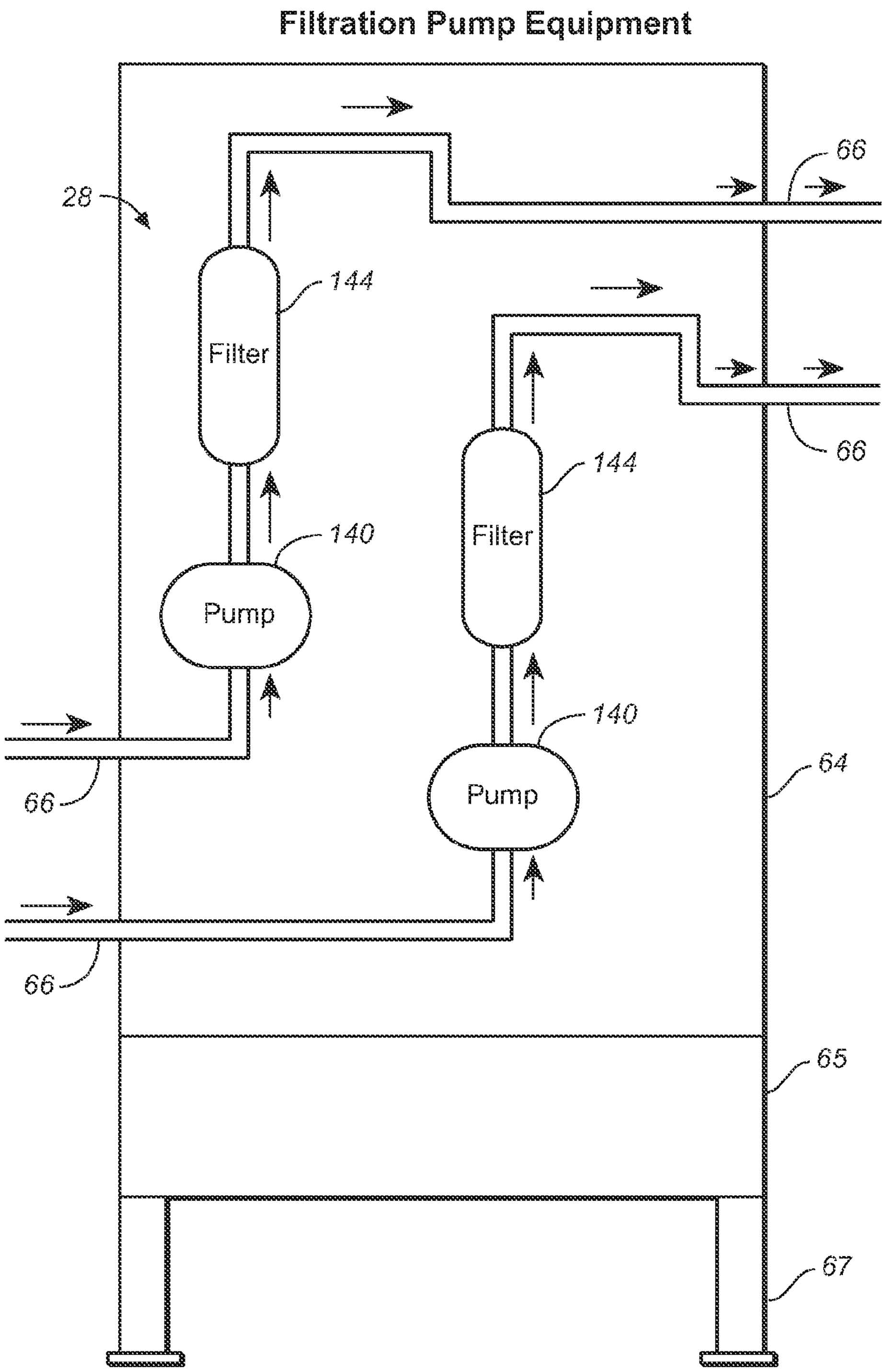
FIG. 3 is a schematic diagram showing the major components of the fuel filtration equipment of the fully automated emergency generator fuel oil system shown in FIGS. 1 and 2.

With additional reference to FIG. 3, the filtration pump equipment 28 is completely enclosed in and protected by a fully self-contained filtration pump cabinet 64. The filtration pump equipment pumps fuel through the entire system and, optionally, cleans the fuel by filtering out contaminants. In the illustrated embodiment, dual dedicated suction supply lines 66 direct fuel from the primary storage tank 14 to the filtration pump equipment 28. See again FIG. 2. After the fuel is filtered and cleaned by filtration pump equipment 28, the clean fuel is discharged into the main supply line 60 from which it is circulated through the entire system and ultimately returned to the product storage tank 26 through return pipes 71. In a typical installation, each supply line 66 leads to and returns from separate storage tanks for redundancy purposes. However, for illustrative simplicity, both supply lines 66 are shown leading to main supply line 60. By regularly filtering and cleaning the fuel resident in, not only the generator fuel tank 32, but in the entire system, unused fuel that would otherwise be wasted, can be reused. Moreover, regular filtering and cleaning of fuel oil prevents buildup of tar-like substances in the product storage tank 26, generator fuel tank 32, and other components which, if left unattended, may require replacement of the affected parts at considerable expense.

Since the filtration pump equipment 28 is served by dedicated supply lines 66, in an emergency situation the filtration pump equipment 28 may act as a secondary back up pump to primary pumping equipment 62 or perform emergency bypass pumping operations. Similarly, the filtration pump equipment 28 can be used to pressurize the main fuel supply line 60 in the event that the primary pump equipment 62 fails.

Filtration pump cabinet 64 is engineered to withstand the effects of a seismic event registering up to 8.2 on the Richter scale. By collecting and protecting the filtration pump equipment 28 in the seismically resistant filtration pump cabinet 64, the filtration pump equipment 28 is much more likely to survive the catastrophic effects of a major earthquake. Furthermore, by collecting the component parts that constitute the filtration pump equipment 28 within filtration pump cabinet 64, the ability to detect fuel leaks is greatly enhanced. A catch basin 65 is provided in the bottom of the cabinet 64 to collect spilled fuel. The catch basis provides an environmental safeguard in the event of a fuel spill and improves leak detection by concentrating any spilled fuel.

According to the invention, the primary storage tank is filtered according to a predetermined schedule. Each filtration cycle is initiated by the MCP 12 and filters the fuel in the primary storage tank 14 for a preset amount of time as discussed further below.

The pumping and filtering operations of the filtration pump equipment are tested daily, weekly and monthly via testing functions managed by the MCP 12, and the results of the testing are recorded by the MCP 12 for generation of reports documenting compliance with state and federal code requirements.

In the illustrated embodiment shown in FIG. 3, filtration equipment includes positive displacement pumps 142 and fuel purifiers 144 for fuel filtration, purification, and water removal. The pumps 142 and fuel purifiers 144 are enclosed in a seismically resistant enclosure 64. The enclosure 64 is provided with a catch basin 65 and is mounted on seismically resistance base 67 which elevates and supports the enclosure 64 and provides mounting anchorage points. Suitable pumps are 30 GPM positive displacement pumps 142 with built-in pressure relief bypass to circulate fuel from the primary storage tank with 1.5 HP single phase 208 VAC pump motors. Suitable purifiers are RCI fuel purifiers. A suitable enclosure is single-door enclosure, constructed of 12 gauge galvanized steel. The enclosure and base should each be designed to withstand or exceed seismic certification requirements for a seismic event of at least 8.0 on the Richter scale.

Additional components in one embodiment of filtration pump equipment 28 may comprise the following:

bucket strainers acting as pump pre-filters;

hydraulic flex hoses for pump vibration isolation;

sight glasses serving as flow indicators for visual inspection of pump operation;

½" ball valves—fuel purifier manual air vent valve;

¾" ball valves—water accumulated in water separator will be manually drained by opening the ball valve located at the bottom of the fuel purifier; and 1½" ball valves—manual fuel shut-off for maintenance activities or emergency shut-down.

Return Pump Equipment

Figure 4:
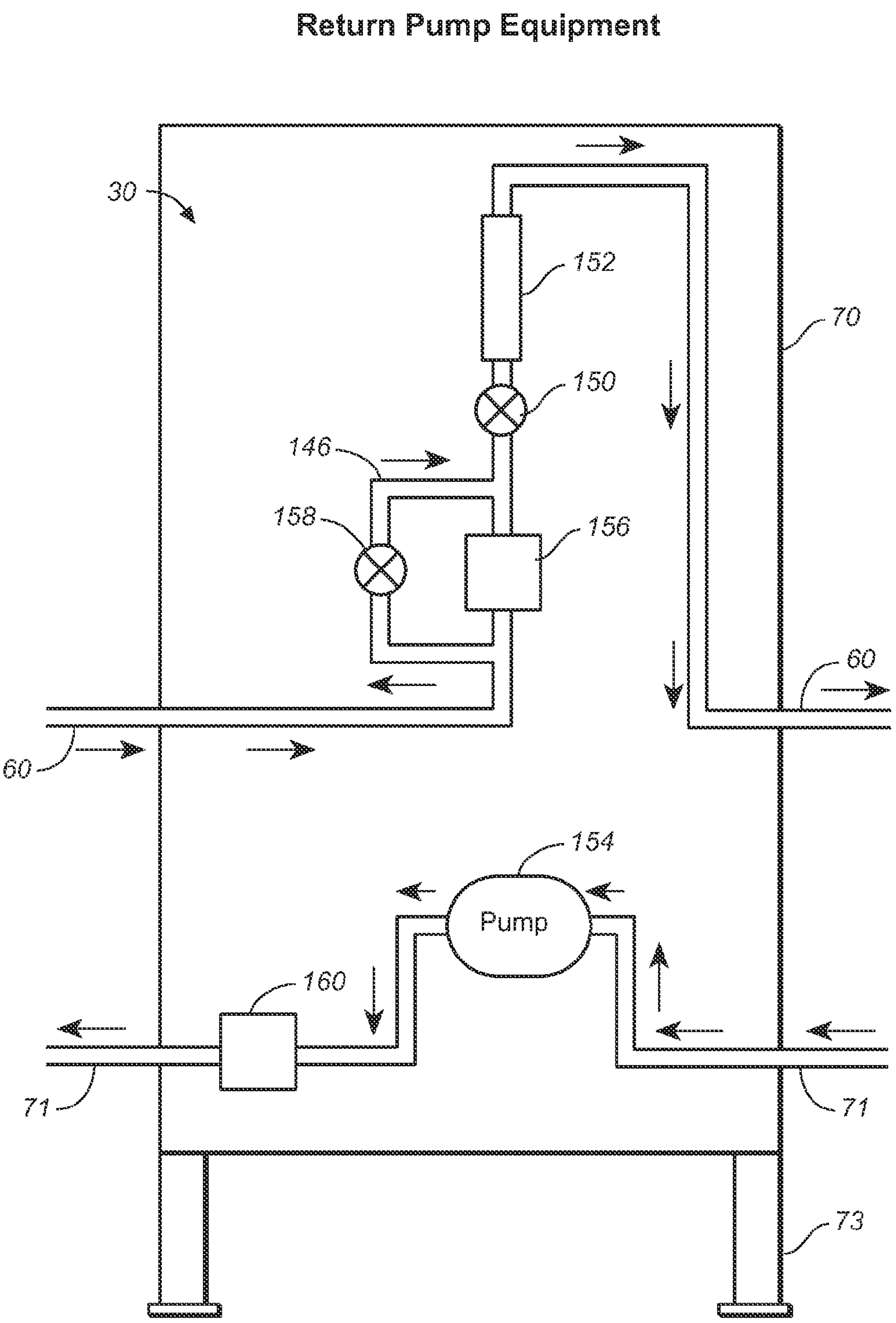
FIG. 4 is a schematic diagram showing the major components of the return pump equipment thereof the fully automated emergency generator fuel oil system shown in FIG. 1.

With reference to FIG. 4, the return pump equipment 30 is completely enclosed in and protected by return pump equipment cabinet 70. The primary function of the return pump equipment 30 is to pump fuel from end user equipment at the furthest end of a fuel delivery system, such as generator 34, back to a main storage tank, such as product storage tank 26. The return pump equipment 30 is interconnected to generator fuel tank 30 and to product storage tank 26 through return piping system 71. The return pump equipment 30 is activated by an instruction received from the MCP 12 only in response to a condition sensed in other parts of the system that requires fuel to be returned to the product storage tank 26. For example, if the MCP 12 detects that excess fuel is being pumped to generator fuel tank 32, the MCP 12 will activate the return pump equipment 30 until it is determined that the amount of fuel in the generator fuel tank 32 has been drawn down to a level that is within acceptable limits.

The return pump equipment 30 can also be used to pump fuel out of a secondary storage tank, e.g., generator fuel tank 32, for filtration.

Return pump cabinet 32 is engineered to withstand the effects of an earthquake registering up to 8.2 on the Richter scale. By collecting and protecting the return pump equipment 30 in the seismically resistant filtration pump cabinet 32, the return pump equipment 30 is much more likely to survive the catastrophic effects of a major seismic event. Furthermore, by collecting the component parts that constitute the return pump equipment 30 within return pump cabinet 32, the ability to detect fuel leaks is greatly enhanced.

An important function of the return pump equipment 30 is the return of spent fuel from the generator fuel tank 32 to the product storage tank 26. Only about ten percent of fuel fed to a fuel oil burning generator is actually consumed. Unused fuel that passes through an active generator 34 is heated and becomes increasingly viscous, commonly known as viscosity breakdown. In prior art systems such unused fuel is returned to the generator fuel tank. In conventional systems, once a sufficient amount of unused fuel has accumulated in the generator fuel tank 32, it is discarded. In a fully automated emergency generator fuel oil system according to the invention, hot unused fuel is pumped back to the product storage tank 26 for remixing, filtering and reuse. The system thereby saves fuel that otherwise would be lost in a conventional manually operated fuel oil generator system. It will be noted that the return pump equipment 30 is generally active while new fuel is being delivered to the generator fuel tank 32 by primary fuel pumps 36.

The return pump equipment 30 is also capable of operating as a secondary emergency pump for supplying fuel to generator 34 or other end user equipment in the event that the primary pumping equipment experiences a catastrophic failure. In the event of such a failure, the MCP 12 will sense that the primary pumping equipment is not pumping fuel to the generator and issue a command to the return pump equipment 30 to take over that function. The return pump equipment 30 will pump fuel to the generator fuel tank 32 for use by the generator 34 until it is determined that the amount of fuel in the generator fuel tank 32 is within acceptable limits.

In the illustrated embodiment of the invention shown in FIG. 4, return pump equipment comprises, on the supply side, supply side solenoid valve 156, bypass loop 146, bypass valve 158, throttle valve 150 and flow meter 152, and on the return side, pump 154 and solenoid valve 160. Fuel moves through the supply components 60, 156, 146, 158, 150, 152 from the main product storage tank 26 to the generator fuel tank 32, and unused fuel is returned from the generator fuel tank 34. Supply side solenoid valve 156 is in communication with and is controlled by the master control panel. If valve 156 is compromised, bypass valve 158 may be opened to channel fuel through bypass loop 146. In the event that the return pump 154 fails or is compromised, throttle valve 150 may be turned to reduce the fuel flow through the supply side to match the reduced flow of fuel through the system, thereby providing crucial time for technicians to examine the system, diagnose problems, and implement solutions. Solenoid valve 160 is operatively tied to pump 154 and opens when pump 154 is activated. Valve 160 also acts as an anti-siphon mechanism to prevent fuel from flowing under vacuum from system components to the product storage tank 26. Flow meter 152 permits a visual inspection of the fuel flow rate through supply line 60.

The return pump equipment is enclosed in a weather and seismically resistant enclosure 70 which is supported and elevated on seismically resistant base 73 which also provides mounting anchorage points. The manual regulating globe valve is set to limit the incoming fill rate to a required flow rate. The flow meter provides visual indication of fuel flow rate set by the manual regulating globe valve. A suitable pump is a 10 GPM positive displacement pump with built-in pressure relief bypass with (1) ½ HP 110 VAC pump motor to return fuel back to primary fuel storage tank controlled by MCP. A suitable enclosure is a single door, UL 508A listed, NEMA Type 12, weather resistant enclosure. A suitable base is one constructed of heavy duty welded steel designed to withstand or exceed a seismic event of at least 8.0 on the Richter scale.

In one embodiment of the invention, additional components of the return pump equipment 30 may comprise the following:

On the Supply Side:

a solenoid valve to open and close the fuel supply path into the secondary tank directly controlled by MCP, and to control 110 vac, 0.5 a activation;

an emergency manual bypass ball valve providing manual override emergency bypass in the event that the solenoid valve fails to open;

isolation ball valves for maintenance/service of solenoid ball valve;

a manual shutoff ball valve to enable closure of supply line input in event of runaway overfill condition and for maintenance activities; and a strainer as a particulate filter.

On the Return Side;

a manual shutoff ball valve to enable closure of return line output in event of runaway return pump condition and for maintenance activities;

a check valve to prevent fuel flow from the primary storage tank into the secondary tank through the return side; and a sight glass flow indicator for visual flow inspection.

Exemplary Operational Sequences

Generator Fuel Tank Fill Procedure

The purpose of the Generator fuel tank Fill Procedure is to maintain normal fuel level in the one or more generator fuel tanks 20 in the system. In one embodiment of the invention, normal fuel level is defined as being above a LOW level, but no higher than a HIGH level. LOW level may be, for example, fifty percent; HIGH level may be ninety percent.

Figure 6:
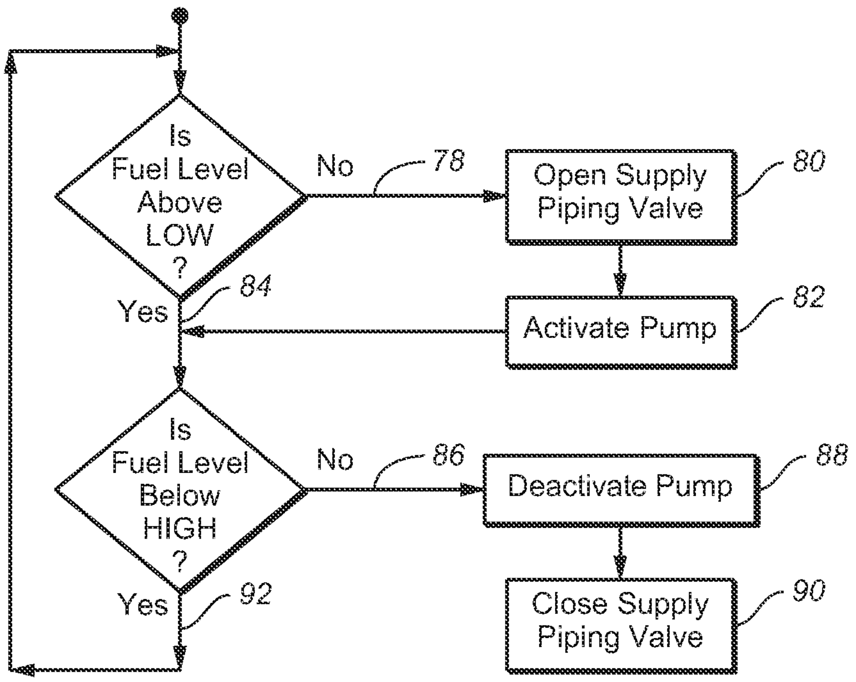
FIG. 6 is a flow chart illustrating the steps of the generator tank fill procedure according to the invention.
Figure 10:
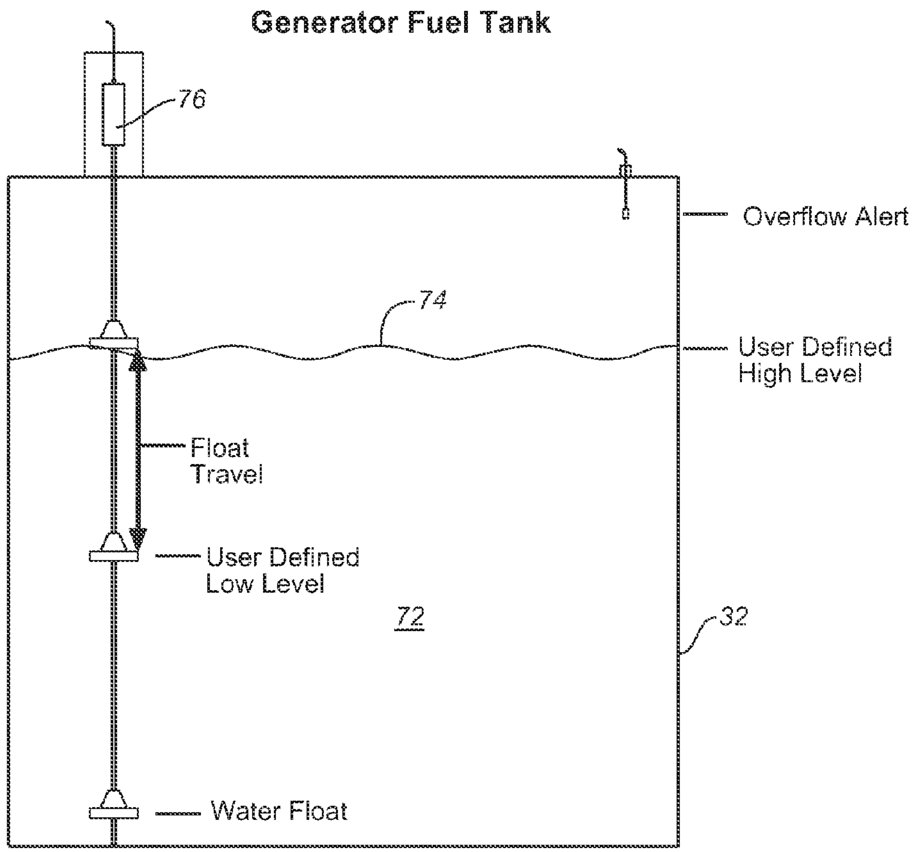
FIG. 10 is a schematic representation of the generator tank shown in FIG. 2 showing a fuel level probe and designated fuel levels.

Usually the generator fuel tank fill procedure is demand initiated. Thus, with reference to FIGS. 6 and 10, as the generator consumes fuel 72 in the generator fuel tank 32, the fuel level 74 decreases. When the fuel in generator fuel tank 32 reaches the LOW level, a generator tank fuel level probe 76, acting as a fuel level sensor, will sense, at 78, that the fuel level 74 has reached the designated LOW level and will transmit a signal to the MCP 12 which is interpreted as a LOW level alarm. In response, the MCP 12 initiates a fill request signal. The fill request signal is executed activating a solenoid valve, at 80, to open a path through supply piping 60 from the storage tank 14 to the generator fuel tank 32 and by activating primary pumping equipment 62, at 82, thereby causing the fuel level in generator fuel tank 32 to rise. If the fuel level probe 76 senses that the fuel level 74 is above the LOW level, at 84, the MCP tests whether the fuel level 74 is below the HIGH level. When the fuel level in generator fuel tank 32 reaches the HIGH level, at 86, the fuel level probe 76 transmits a signal to the MCP which is interpreted as a HIGH level alarm. In response, the MCP issues signals deactivating the primary pumping equipment, at 88, and closing the solenoid valve, at 90. If the fuel level probe 76 senses that the fuel level 74 is below the HIGH fuel level, the procedure returns, at 92, to the initial query regarding whether the fuel level is above the LOW level. Optionally, within a designated short interval, the MCP will generate a delivery report documenting the generator fuel tank fill procedure and transmit a message via email to a system operator specifying the quantity of fuel used during the procedure.

Generator Fuel Tank Turnover Procedure

The purpose of the generator fuel tank turnover procedure is to rotate fuel in the generator fuel tank 32 to avoid stagnation by replacing fuel in the tank 20 with cleaned fuel from the product storage tank 26. A suitable interval for “turning over” the fuel in the generator fuel tank 32 is one week.

Figure 7:
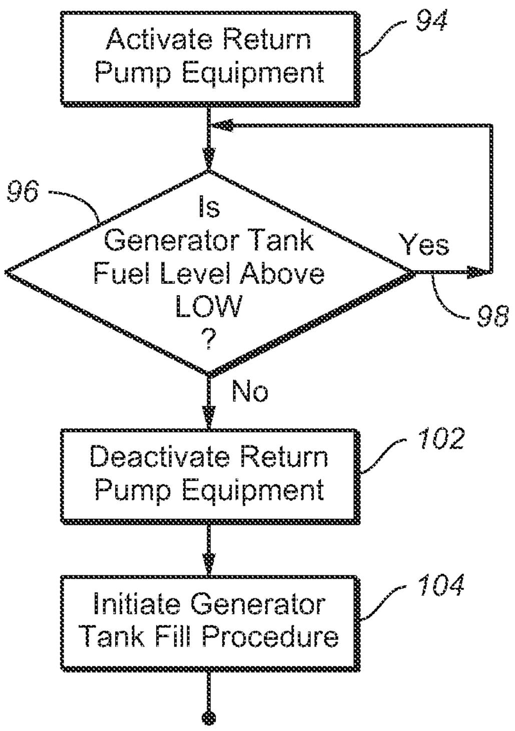
FIG. 7 is a flow chart illustrating the steps of the generator tank turnover procedure thereof.

With reference to FIG. 7, at a designated time, the MCP 12 will initiate a generator fuel tank turnover sequence. Initially the MCP activates the return pump equipment, at 94, which returns fuel back to the product storage tank 26. The MCP then queries whether the generator tank fuel is above the LOW level, at 96. If the fuel level is above the LOW level, the query is repeated, at 98. When a fuel float in the generator fuel tank 14 reaches a LOW level, at 100, the MCP deactivates the return pump equipment, at 102, and initiates a generator fuel tank fill procedure, at 104, as discussed above.

Generator Fuel Tank Overfill Procedure

The purpose of the generator fuel tank overfill procedure is to lower fuel in the generator fuel tank 32 if for any reason the fuel level has reached an overflow alert level. A representative overflow alert level may be designed as fuel level being at ninety-three percent.

Figure 8:
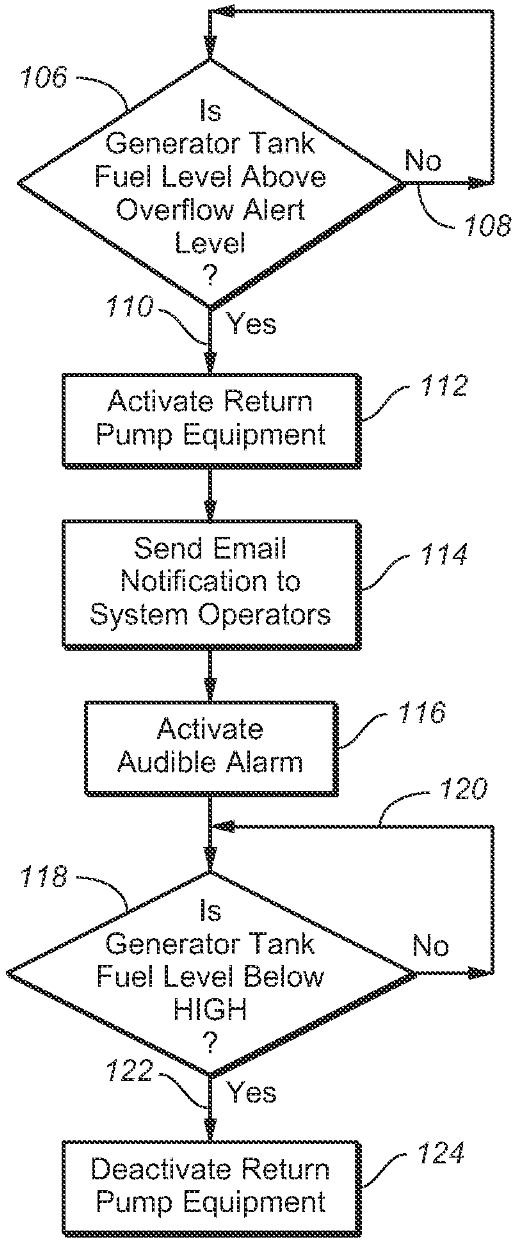
FIG. 8 is a flow chart illustrating the steps of the generator tank overfill procedure thereof.

With reference to FIG. 8, the generator fuel tank overfill procedure begins with a query as to whether the generator tank fuel level is above the designated overflow alert level, at 106. If the fuel level is below the overflow alert level, the query is repeated, at 108. If the fuel level is above the overflow alert level, at 110, the MCP activates the return pump equipment, at 112, to start removing fuel from the generator fuel tank 32 and send it to the product storage tank 26. The MCP optionally sends an email notification to the system operator, at 114, and activates an audible alarm, at 116. The fuel return rate is necessarily calibrated to exceed the rate at which fuel is being pumped into the generator fuel tank. The generator fuel tank overfill procedure then queries whether the fuel level is below the HIGH level, at 118. If it is, the query is repeated, at 120. Once the fuel level in the generator fuel tank decreases below the HIGH level, at 122, the MCP deactivates the return pump equipment 30, at 124.

Fuel Filtration Procedure

Figure 9:
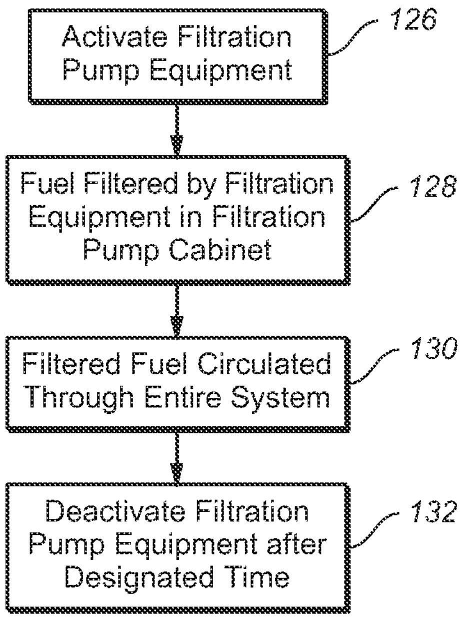
FIG. 9 is a flow chart illustrating the steps of the fuel filtration procedure thereof.

The purpose of the Fuel Filtration Procedure is to maintain the purity of fuel in the system. The Fuel Filtration Procedure is a regularly scheduled event, and is suitably performed every week. With reference to FIG. 9, the procedure is initiated by activating the filtration pump equipment, at 126, which draws fuel from the product storage tank 26 passing it through the fuel filters in the filtration pump equipment 28, at 128, and discharges the filtered fuel into system supply pipes for circulation throughout the system, at 130. After a designated time, the filtration pump equipment is deactivated, at 132, terminating the procedure. The procedure is designated to run for a sufficient time to pass all the fuel in the product storage tank 26 through the filtration pump equipment 28.

As indicated above, sensors are positioned at various points throughout the system. The primary function of the network of sensors is to detect fuel leaks in any part of the system including secondary containment pipes, vaults, tanks, and mechanical slabs. The sensors also indicate possible over fill and under fill conditions, spillage during fueling, and breaks and broken connections in pipes and other equipment. The MCP 12 alarm and report program will identify the exact location of such a problem in real time as indicated by this sensor and alarm system.

It should be understood that, while the description of the invention herein discloses a system in which fuel oil is being circulated, the invention can be utilized for numerous other gas or liquid products for delivery to end user equipment on demand such as water to cooling equipment in a nuclear power plant, for fueling tankers, ferry boats, trains, and boilers, and servicing lift stations and pumping plants.

A fully automated emergency generator fuel oil system according to the invention operates faster and more accurately than manually operated systems, allows adjustments to system components in real time to achieve optimum operating performance, significantly reduces labor and operating costs, decreases system failures, increases system life, and improves system reliability. An added benefit is that by collecting critical and sensitive system components in seismically resistant cabinets, a system is created having significantly improved resistance to seismic events.

There have thus been described and illustrated certain preferred embodiments of a fully automated emergency generator fuel oil system according to the invention. Although the present invention has been described and illustrated in detail, it is clearly understood that the same is by way of illustration and example only and is not to be taken as limiting, the spirit and scope of the present invention being limited only by the terms of the appended claims and their legal equivalents.

What is claimed is:

1. A fully automated emergency generator fuel oil system comprising:

a plurality of emergency generator fuel oil system components, said plurality of components including:

a product storage tank for storing fuel oil, a generator fuel tank in fluid communication with said product storage tank, said generator fuel tank for providing a local supply of fuel oil to an adjacent generator, primary pumping equipment for pumping fuel oil from said product storage tank to said generator fuel tank, a supply piping system interconnecting said product storage tank and said generator fuel tank, a return piping system separate from said supply piping system, said return piping system interconnecting said product storage tank and said generator fuel tank, and return pumping equipment for pumping fuel oil from said generator fuel tank to said product storage tank through said return piping system, said return pumping equipment operable while fuel oil is being pumped through said supply piping system, a plurality of sensors for continuously monitoring the physical status of said system components, and a master control panel in communication with said plurality of sensors, said master control panel having a processor for interpreting signals received from said plurality of sensors to determine if one of a plurality of events has occurred, each of said plurality of events defined by the physical status of one or more of said system components, said master control panel in operative communication with said system components, wherein when said processor determines that an event has occurred, said processor issues one or more instructions to execute one or more protocols that control the function of one or more of said system components.

2. The fully automated emergency generator fuel oil system of claim 1 wherein:

said master control panel has one or more relays, each relay in communication with said processor, and one or more controllers, each of said controllers in communication with one or more of said relays and with one of said system components.

3. The fully automated emergency generator fuel oil system of claim 1 further comprising:

a master control panel cabinet, said master control panel enclosed in said master control cabinet, wherein said master control cabinet is capable of withstanding a seismic event measuring at least 8.0 on the Richter scale, and said master control panel is capable of retaining full functionality, during a seismic event measuring at least 8.0 on the Richter scale, and said master control panel is protected by said master control panel cabinet against adverse weather conditions.

4. The fully automated emergency generator fuel oil system of claim 3 further comprising:

said master control panel cabinet includes a heavy duty seismic base and a master control panel cabinet enclosure, said base supporting and elevating said master control panel cabinet enclosure, said master control panel enclosed in said master control panel enclosure, said base capable of withstanding a seismic event of at least 8.0 on the Richter scale.

5. The fully automated emergency generator fuel oil system of claim 1 wherein:

said plurality of sensors includes a fuel level sensor capable of detecting fuel levels in said generator fuel tank at a low level and at a high level, said high level indicating a fuel level higher than said low level, wherein when said master control panel receives a signal from said fuel level sensor indicating that the fuel level in said generator fuel tank is at said low level, said master control panel issues an instruction to activate said primary pumping equipment, and when said master control panel receives a signal from said fuel level sensor indicating that the fuel level in said generator fuel tank is at said high level, said master control panel issues an instruction to deactivate said primary pumping equipment.

6. The fully automated emergency generator fuel oil system of claim 1 further comprising:

said fuel level sensor of said generator fuel tank being capable of detecting fuel levels at an overflow alert level, said overflow alert level higher than said high level, such that when said master control panel receives a signal from said fuel level sensor indicating that the fuel level in said generator fuel tank is at said overflow alert level, said processor issues an instruction to activate said return pump equipment to pump fuel from said generator fuel tank to said product storage tank, and when said master control panel receives a signal from said fuel level sensor indicating that the fuel level in said generator fuel tank is below said high level, said processor issues an instruction to deactivate said return pump equipment.

7. The fully automated emergency generator fuel oil system of claim 1 further comprising:

a return pump equipment cabinet, said return pump equipment being fully enclosed in said return pump equipment enclosure, wherein said return pump equipment cabinet is capable of withstanding, and said return pump equipment is capable of retaining full functionality during, a seismic event measuring at least 8.0 on the Richter scale, and wherein said return pump equipment is protected by said return pump equipment cabinet against adverse weather conditions.

8. The fully automated emergency generator fuel oil system of claim 7 wherein:

said return pump equipment includes a solenoid valve and a pump, said solenoid valve and pump each in operative communication with said master control panel, said solenoid valve for opening and closing said return piping system, and said pump for pumping fuel oil through said return piping system.

9. The fully automated emergency generator fuel oil system of claim 8 wherein:

said return pump equipment includes a fuel leak sensor for sensing a fuel leak in said return pump equipment.

10. The fully automated emergency generator fuel oil system of claim 7 wherein:

said return pump equipment cabinet includes a heavy duty seismic base and an enclosure, said base supporting and elevating said enclosure, said return pump equipment enclosed in said enclosure, said base capable of withstanding a seismic event of at least 8.0 on the Richter scale.

11. The fully automated emergency generator fuel oil system of claim 1 wherein:

at a designated time said master control panel issues an instruction to activate said return pumping equipment to draw fuel from said generator fuel tank, and when said master control panel receives a signal indicated that the fuel level in said generator fuel tank is below said low level, said master control panel issues an instruction to deactivate said return pumping equipment.

12. The fully automated emergency generator fuel oil system of claim 1 further comprising:

fuel filtration equipment for circulating fuel oil between said product storage tank and said generator fuel tank and for filtering out contaminants in fuel oil resident in said product storage and generator fuel tanks, said fuel filtration equipment in fluid communication with said product storage tank and said generator fuel tank.

13. The fully automated emergency generator fuel oil system of claim 12 further comprising:

a dedicated supply pipe interconnecting said filtration pump equipment and said product storage tank, and wherein said supply piping system interconnects said filtration pump equipment and said generator tank.

14. The fully automated emergency generator fuel oil system of claim 13 further comprising:

a fuel filtration equipment cabinet, said fuel filtration equipment being fully enclosed in said fuel filtration equipment cabinet, wherein said fuel filtration equipment cabinet is capable of withstanding, and said fuel filtration equipment is capable of retaining full functionality during a seismic event measuring at least 8.0 on the Richter scale, and wherein said fuel filtration equipment is protected by said fuel filtration equipment cabinet against adverse weather conditions.

15. The fully automated emergency generator fuel oil system of claim 14 wherein:

said fuel filtration equipment cabinet includes a heavy duty seismic base and a fuel filtration cabinet enclosure, said base supporting and elevating said fuel filtration cabinet enclosure, said fuel filtration equipment enclosed in said fuel filtration cabinet enclosure, and said base capable of withstanding a seismic event of at least 8.0 on the Richter scale.

16. The fully automated emergency generator fuel oil system of claim 14 wherein:

said fuel filtration equipment includes one or more fuel pumps and one or more fuel filters, each fuel pump in operative communication with said master control panel, each fuel filter in fluid communication with one of said fuel pumps, and said fuel filters for filtering out contaminants in fuel oil.

17. The fully automated emergency generator fuel oil system of claim 12 wherein:

said master control panel is in operative communication with said fuel filtration equipment, such that at a first designated time said master control panel issues an instruction to activate said fuel filtration equipment, and at a second designated time said master control panel issues an instruction to deactivate said fuel filtration equipment.

18. A method for operating a fully automated emergency generator fuel oil system comprising:

monitoring the physical status of each of a plurality of emergency generator fuel oil system components, said plurality of components including:

a product storage tank for storing fuel oil, a generator fuel tank in fluid communication with said product storage tank, said generator fuel tank for providing a local supply of fuel oil to an adjacent generator, primary pumping equipment for pumping fuel oil from said product storage tank to said generator fuel tank, a supply piping system interconnecting said product storage tank and said generator fuel tank, a return piping system separate from said supply piping system, said return piping system interconnecting said product storage tank and said generator fuel tank, and return pumping equipment for pumping fuel oil from said generator fuel tank to said product storage tank through said return piping system, said return pumping equipment operable while fuel oil is being pumped through said supply piping system, determining if one of a plurality of events has occurred, based on the physical status of said plurality of emergency generator fuel oil system components, and controlling the function of one or more of said system components responsive to one of said plurality of events having been determined to occur, wherein each of said plurality of events is defined by the physical status of one or more of said system components.

19. The method for operating a fully automated emergency generator fuel oil system of claim 18 further comprising:

receiving a signal from one of a plurality of sensors indicating that the fuel level in said generator fuel tank is at a low level, issuing an instruction to execute a protocol to pump fuel from said product storage tank to said generator fuel tank, receiving a signal from said sensor indicating that the fuel level in said generator fuel tank is at a high level, and issuing an instruction to cease pumping fuel from said product storage tank to said generator fuel tank.

* * * * *